(12) United States Patent
Stephens

(10) Patent No.: US 9,670,690 B2
(45) Date of Patent: Jun. 6, 2017

(54) HALL EFFECT SENSOR GRID ARRAY GUIDANCE SYSTEM

(71) Applicant: Park Plus Inc., Oakland, NJ (US)

(72) Inventor: Troy Allen Stephens, Melbourne, FL (US)

(73) Assignee: PARK PLUS, INC., Oakland, NJ (US)

( * ) Notice: Subject to any disclaimer, the term of this patent is extended or adjusted under 35 U.S.C. 154(b) by 0 days.

(21) Appl. No.: 14/542,956

(22) Filed: Nov. 17, 2014

(65) Prior Publication Data
US 2015/0139762 A1    May 21, 2015

Related U.S. Application Data

(60) Provisional application No. 61/905,539, filed on Nov. 18, 2013.

(51) Int. Cl.
| | | |
|---|---|---|
| *E04H 6/22* | (2006.01) | |
| *G05D 1/02* | (2006.01) | |
| *E04H 6/42* | (2006.01) | |

(52) U.S. Cl.
CPC .............. *E04H 6/22* (2013.01); *E04H 6/424* (2013.01); *G05D 1/0261* (2013.01)

(58) Field of Classification Search
CPC ...................................................... E04H 6/22
See application file for complete search history.

(56) References Cited

U.S. PATENT DOCUMENTS

| | | | | |
|---|---|---|---|---|
| 3,411,603 A * | 11/1968 | Kohls | ................. | G05D 1/0261 180/168 |
| 3,495,677 A * | 2/1970 | Wilson | ................. | G05D 1/0261 180/168 |
| 4,714,124 A * | 12/1987 | Laib | ..................... | G05D 1/0261 180/168 |
| 4,990,814 A * | 2/1991 | Tanski | ............... | H03H 9/02976 310/313 D |
| 4,990,841 A * | 2/1991 | Elder | ................... | G05D 1/0263 180/168 |
| 5,034,673 A * | 7/1991 | Shoji | ..................... | G05D 1/0265 180/168 |
| 5,216,605 A * | 6/1993 | Yardley | ................ | G05D 1/0261 180/168 |
| 6,684,794 B2 * | 2/2004 | Fiske | ..................... | B60L 13/04 104/281 |
| 6,873,235 B2 * | 3/2005 | Fiske | ................... | F16C 32/0408 242/443 |
| 6,874,244 B2 * | 4/2005 | Birrer | ................... | B66B 1/3492 187/294 |
| 7,537,092 B2 * | 5/2009 | Birrer | ................... | B66B 1/3492 187/391 |

(Continued)

*Primary Examiner* — James Keenan
(74) *Attorney, Agent, or Firm* — Gerald E. Hespos; Michael J. Porco; Matthew T. Hespos

(57) ABSTRACT

A parking system includes automated guided vehicles (AGVs) for moving automobiles to and from parking spaces in a parking facility. Each AGV is provided with a Hall effect sensor array. The parking facility has magnet arrays affixed to the floor of the parking facility. Each magnet array includes a plurality of magnets, with a specified arrangement of positive and negative poles of the magnets in the magnet array. The Hall effect sensor array senses the magnets and guides the AGV through the parking facility based on the position and alignment information determined by the Hall effect sensors.

10 Claims, 13 Drawing Sheets

(56) References Cited

U.S. PATENT DOCUMENTS

| | | | |
|---|---|---|---|
| 8,188,892 B2* | 5/2012 | Shimizu | G05D 1/0263 340/539.21 |
| 2005/0207876 A1* | 9/2005 | Springwater | E04H 6/24 414/231 |
| 2013/0183124 A1* | 7/2013 | Wastel | E04H 6/22 414/261 |

* cited by examiner

HALL EFFECT SENSOR GRID ARRAY GUIDANCE SYSTEM

CROSS-REFERENCE TO RELATED APPLICATION

This application claims priority on U.S. Provisional Patent Appl. No. 61/905,539 filed on Nov. 18, 2013, the entire disclosure of which is incorporated herein by reference.

BACKGROUND OF THE INVENTION

1. Field of the Invention

The invention relates to an automated parking garage, automated guided vehicles for moving trays with or without the passenger vehicles thereon and a method for operating such a garage. The invention also relates to an automated self-storage facility, a combination of parking and self-storage facility and a method for operating such a facility.

2. Description of the Related Art

Urban areas throughout the world continue to grow in size and population density, and the number of vehicles in an urban area varies directly with the population size and density. As a result, parking availability is a major problem in most urban areas.

Vehicle lift devices have been used in parking lots for decades to increase the number of vehicles that can be parked in a given area. More particularly, a vehicle lift device has one or more platforms that can receive a vehicle. The lift device then elevates the vehicle on the platform so that at least one additional vehicle can be parked under the platform. Vehicle lift devices that can park four or more vehicles in a vertical array are fairly common. Lift devices of this general type are available from Park Plus, Inc. and are disclosed in the patent literature. Parking lots that rely upon vehicle lift devices require considerable room for the vehicle owner and/or the parking lot operator to maneuver vehicles from the entrance of the facility to the appropriate vehicle lift device. Most parking lots and parking garages that rely upon this technology do not have automated systems for locating the vehicle or for organizing the stacked arrangement of vehicles. As a result, a significant amount of maneuvering is required to park or retrieve a vehicle. These parking systems tend to be very labor intensive and create the potential for minor accidents as the vehicles are being maneuvered.

Parking garages can extend several stories high, and therefore permit a larger number of vehicles to be parked with in a given geographic footprint. However, a conventional parking garage requires considerable space for vehicle maneuvering. The above-described vehicle lift devices can be employed in a parking garage to increase the number of vehicles that can be accommodated. However, few parking garages will permit more than two vehicles to be stacked vertically on any floor of the parking garage.

Some parking systems include complex mechanisms to move a vehicle through an array of X, Y, Z coordinates from an ingress location to a parking location. These systems subsequently retrieve the parked vehicle and return the retrieved vehicle to an egress location. Most of these existing systems use technology that has been available in automated warehouses for decades. In particular, the typical automated parking system of this type requires the vehicle to be driven into a carrier that has a rectangular platform, four corner stanchions extending up from the respective corners of the platform and horizontal top supports that connect upper ends of the stanchions. The vehicle is driven onto the platform of the carrier and the carrier then is moved through a specified array of X, Y, Z coordinates to a particular parking location. The vehicle stays with the three-dimensional carrier for the duration of the parking. The carrier then is moved through a comparable array of X, Y, Z coordinates when the vehicle is to be retrieved so that the carrier with the vehicle thereon can be returned to an egress location where the vehicle is accessed by the driver. Carriers of this type occupy a large volume of space even when the carrier is not being used. These large carriers ideally should remain close to the entrance location of the automated parking facility so that empty carriers can be made available at the entry location to receive and process an incoming vehicle without a long wait time. As a result, the maneuvering of the carriers in a system of this type can be extremely complicated. Additionally, the mechanical systems that move the carriers through the X, Y, Z coordinates can be very complicated and inefficient.

Co-pending U.S. patent application Ser. No. 13/724,718 discloses an automated parking system with a parking structure or location that has at least one level, and typically plural levels or floors. The parking structure has at least one bay for ingress and/or egress of vehicles. At least one vertically reciprocating conveyor (VRC) is provided for moving vehicles between the access point and a parking floor in the parking structure. The system also includes a plurality of stackable trays, each of which can accommodate a vehicle thereon. The system further includes at least one automated guided vehicle (AGV) that can transport at least one tray within the parking structure with or without a vehicle thereon. The various floors of the parking structure may be provided with means for guiding the automated guided vehicles around the particular floor between the VRC and the respective parking locations. For example, barcodes, RFID tags, lasers and/or guide wires may be attached to or embedded in the floor, ceiling, walls, pillars or the like.

The parking system disclosed in co-pending U.S. patent application Ser. No. 13/724,718 has many desirable features. However, barcodes applied at selected locations around the various floors of the parking structure can become obscured by dirt, debris or the like. Systems that rely upon lasers and/or guide wires embedded in the floor or ceiling are costly to install and difficult to change. Guide wires attached to the surface of the floor can be reconfigured without excessive cost, but are easily damaged by vehicles.

Accordingly, an object of the invention is to provide an accurate system for guiding vehicles in an automated parking facility where the guiding system is not affected by accumulated dirt or debris and is not likely to be damaged by contact with a vehicle.

Another object of the invention is to provide an automated parking system that can achieve more efficient maneuvering of vehicles.

SUMMARY OF THE INVENTION

The invention relates to an automated parking system with a parking structure or location that has at least one level, and typically plural levels or floors. The parking structure or location has at least one bay for ingress and/or egress of vehicles. At least one vertically reciprocating conveyor (VRC) is provided for moving vehicles between the access point and a parking floor in the parking structure. The system further includes at least one automated guided vehicle (AGV) that can transport at least one vehicle within the parking structure. The system may also include a plurality of stackable trays, each of which can accommodate a vehicle thereon. The AGVs may be configured to transport a tray with a vehicle thereon. The parking structure or location comprises magnet arrays secured at selected locations along the parking level or floor, and preferably on each parking level or floor of a parking structure. Each magnet array may comprise a rectangular array of magnets that may be attached or laminated to a sheet that can be affixed to the floor of the parking structure. Each AGV is provided with a Hall effect sensor apparatus that is operative to sense the magnets in each magnet array and to determine locational and alignment information based on the sensed data. The AGV furthering has a signal transmitter and a signal receiver that are in communication with a control unit for the parking facility. The AGV communicates with the control unit for guiding the AGV through the parking facility.

Each magnet in the magnet array may be configured to define a unique magnetic signature. The unique signature may be achieved by the locational disposition of positive and negative poles in each magnet in the respective grid in the magnetic array. Additionally, each of the unique magnets may have a known and specified position in the magnetic array. Furthermore, each magnet array may have a unique signature to distinguish each magnet array from each other magnet array. The Hall effect sensor apparatus on the AGV has an array of Hall effect sensors and is operative to identify each magnet array and to identify each magnet in the respective magnet array as the respective magnet is sensed. Thus, the Hall effect sensor apparatus can determine specified information about the location, alignment and direction of movement of the AGV based on the particular magnet arrays and the particular magnets that are sensed and the order in which the magnet grids are sensed. The onboard controller of the AGV then can make adjustments to the AGV based on the specific magnets detected by the specific Hall effect sensors of the Hall effect sensor apparatus and based on the sequence of detection of the specific magnets. Additionally, or alternatively, the signal transmitter of the AGV can transmit to the control unit of the parking facility information regarding the magnet grids that have been sensed by the Hall sensor. The control unit of the parking facility then can issue appropriate instructions to the AGV for altering or stopping the movement of the AGV.

The automated guided vehicle (AGV) includes a substantially rectangular frame that defines a generally rectangular interior for storing the operative components of the AGV. The horizontal length and width dimensions of the frame are selected in accordance with the dimensions of the tray, which in turn is selected in accordance with dimensions of vehicles. More particularly, the length and width dimensions of the AGV may be selected to enable the AGV to advance between the legs of a tray on which the vehicle may be supported. The height dimension of the frame and the height dimension of the legs are selected to enable the AGV to advance between the floor on which the tray is supported and the lower side of the vehicle supporting surface of the tray.

Areas of the AGV inward of the frame include the Hall sensor, communication devices for communicating with the control unit of the parking facility and an array of batteries for providing the motive power to the AGV. Charging connections preferably extend from the batteries to an external location on the frame of the AGV. Thus, the AGV can be parked in proximity to a charging station and/or can be connected to a charging station for periodic recharging of the batteries. The charging can be carried out through a wired connection or through induction. Areas of the AGV inward of the frame further include controls that communicate with a central controller of the automated parking facility for receiving location and route information from the central controller of the automated parking facility and for guiding the AGV to the designated location.

Each AGV includes two raisable platform lifts that can be moved vertically relative to the horizontal plane defined by the frame of the AGV. The platform lifts preferably are disposed at opposite ends of the AGV or at all four corners of the AGV. The platform lifts are connected operatively to the control of the AGV and move between a retracted position and an extended position when the AGV is determined to have been positioned properly under a corresponding tray for lifting the tray. This relative positioning of the AGV and the corresponding tray can be determined by sensors provided on the AGV and/or on the tray.

Each AGV further includes a plurality of drive devices communicating with the control of the AGV and operative to drive the AGV to locations dictated by the control of the AGV and/or the control of the parking system. The preferred AGV includes four drive devices located respectively near the corners of the AGV. For example, the above-described platform lifts may be at the extreme opposite ends of the AGV and the drive devices may be inwardly of the platform lifts. Each drive device preferably includes two wheels mounted on a common axle or on two collinear axles. The rotational axes of the wheels all lie in a common plane that is parallel to the plane defined by the frame of the AGV and parallel to the horizontal surface on which the AGV is supported. Each wheel of each drive device preferably is driven by its own motor. The wheels and the corresponding motors of each drive device are mounted to a turntable that is rotatable about a vertical axis. The turntable of each drive device can be operated by the motors that drive the wheels. Rotation of the turntable causes rotation of the wheel/motor assembly about a vertical axis for steering the AGV. The wheels permanently extend below the lower surface of the frame of the AGV so that the wheels always carry the weight of the AGV.

The controller is operative to issue control instructions to the drive devices for operating the respective drive devices independently of one another, and in certain instances for operating the respective wheels of each drive device independently. As a result, steering of the respective drive devices is carried out pursuant to instructions from the controller by rotating one or more of the turntables and driving selected wheels in accordance with the required direction of travel.

The parking system of the invention operates by using the AGV to transport empty trays from the egress bay either to the ingress bay or to a storage magazine near the ingress bay. The empty tray may be deposited in a recess in the ingress bay or the egress bay so that the top parking surface of the tray is substantially flush with the approach surface for a vehicle entering the ingress bay or the exit surface for the vehicle leaving the egress bay. An approaching vehicle is guided by electro-optical signage and/or by audio instructions so that the vehicle can be positioned properly on the tray. The positioning of the vehicle on the tray is assessed by photo-optical sensors in the ingress bay and signage that will guide the driver of the vehicle to a proper stop position at which the vehicle is supported properly on the tray. The driver will exit the vehicle and may receive a receipt that can be used to reclaim the vehicle. The receipt can be a paper or cardboard receipt or an electronic receipt that can be loaded electronically onto a cell phone or other electronic device. Alternatively, the driver can use a credit card and a regular parker may merely use an assigned PIN. The sensors in the ingress bay may be operative for determining when the driver and any passengers have departed the vehicle and the ingress bay. The sensors also may determine the condition of the vehicle so that pre-existing damage can be documented. The tray with the vehicle thereon then is prepared for transport to the VRC. This preparation can include elevating the tray/vehicle combination sufficiently for engagement by an AGV that will transport the tray/vehicle combination to a VRC. Preferably, however, the AGV driving surface in the parking structure may be at the same level as the surfaces in the ingress and egress bays that support the trays. Thus, the AGV merely drives under the trays, lifts the tray and the vehicle thereon with the platform lifts and then transports the tray/vehicle combination from the egress bay toward the VRC. The parking structure can include a queue area between the ingress bay and the VRC for storing the tray/vehicle combinations while waiting for an elevator to become available.

The tray/vehicle combinations are loaded onto a VRC either by the conveyor system or by an AGV, which then leaves the VRC with the tray and the vehicle therein. The VRC then transports the tray/vehicle combination to a selected floor for storing the vehicle. The floor and the storage location are selected and stored by the central controller of the parking facility. The location may be selected based on an intended parking duration or pickup time designated by the driver at the ingress bay. Once at the proper floor, an AGV will move between the legs of the tray and into a position for supporting the tray and the vehicle thereon. The platform lifts of the AGV then will activate to lift the tray sufficiently for the weight of the tray and vehicle to be supported by the AGV with the legs of the tray at a slight distance from the floor. The control unit of the AGV then will control the drive devices to move the AGV with the tray/vehicle combination thereon to the selected location on the floor of the parking structure. In this regard, the motors of the respective drive devices can be operated in accordance with independent instructions received from the control device on the AGV so that the wheels can be powered independently for guiding the AGV along an appropriate route to the selected parking location. Movement of the AGV to the selected parking location is dictated by the input received by respective Hall effect sensors of the Hall effect sensor apparatus upon passing in proximity to the respective magnets of the respective magnet arrays. In this regard, the information sensed by the Hall effect sensors can be used to adjust the alignment of the AGV, to turn the AGV about an axis perpendicular to the parking floor to reverse the movement of the AGV and to change the movement from, for example, and X direction to a Z direction. Once at the selected parking location, the platform lifts of the AGV will lower the tray sufficiently for the legs of the tray to be supported on the floor. The AGV then will depart from the tray/vehicle combination and will proceed back to the VRC, as guided by the Hall sensor on the AGV and the magnet arrays on the floor. The AGV then will await the next arriving tray/vehicle combination. Alternatively, the AGV may travel to retrieve a vehicle that must be delivered to the egress bay.

The above described process for parking a vehicle is substantially reversed for retrieving the vehicle. More particularly, an AGV will be guided to the vehicle location by the Hall sensor on the AGV and the magnet arrays on the floor and will move between the legs and under the tray. The platform lifts of the AGV will activate to raise the tray sufficiently for the legs to be spaced slightly from the floor. The AGV then will transport the tray/vehicle combination back to the VRC so that the vehicle can be transported to the egress bay for pickup by the driver.

DETAILED DESCRIPTION OF THE PREFERRED EMBODIMENT

Figure 1:
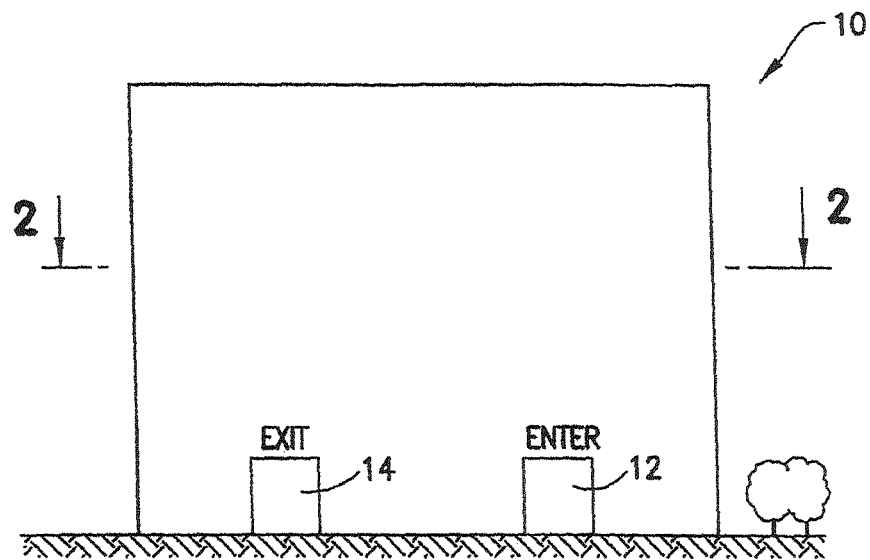
FIG. 1 is a front elevation view of a parking structure that includes the system of the subject invention.
Figure 2:
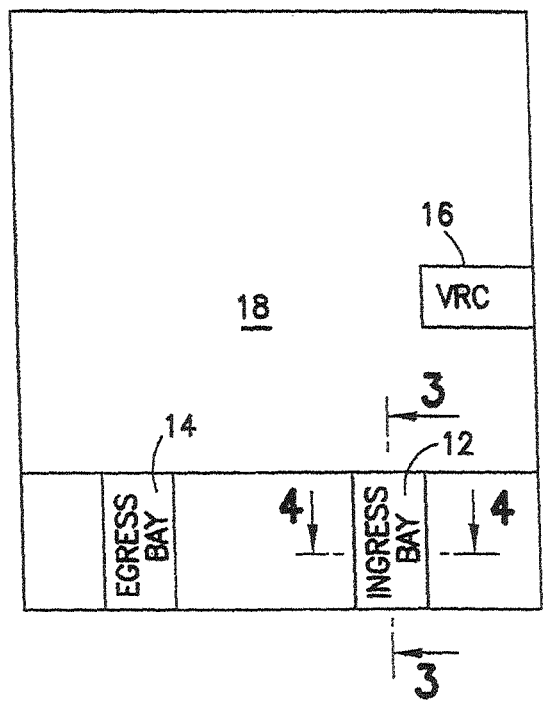
FIG. 2 is a cross-sectional view taken along line 2-2 of FIG. 1, and showing the ground floor where vehicles enter and exit a multi-floor parking facility.

A parking garage in accordance with the invention is identified generally by the numeral 10 in FIGS. 1-5. The parking garage 10 includes an ingress bay 12 and an egress bay 14, each of which is dimensioned to receive an automotive vehicle. At least one vertical reciprocating conveyor (VRC) 16 is disposed in proximity to the ingress and egress bays 12 and 14. Additionally, a queue area 18 is disposed between the ingress bay 12 and the VRC 16 to accommodate vehicles that are waiting for the VRC 16 to become available. Automated doors preferably are provided between the queue area 18 and in the ingress and egress bays 12 and 14 to prevent customers from accessing the queue area 18. The doors to the queue area 18 will be open only after the customer has left the ingress or egress bays 12 and 14. The parking garage 10 further includes a plurality of floors that can be accessed by the VRC 16. Each floor includes a plurality of areas where vehicles can be parked. Each floor has a plurality of magnet arrays 20 affixed to the floor at positions spaced apart, for example, by approximately 10 feet. Each magnet array 20 includes a plurality of magnets 22. The pattern of positive and negative poles of each magnet 22 within each magnet array 20 is specified to define unique addresses or signatures for the magnets 22 and the magnet arrays 20. Each magnet 22 preferably is a thin planar structure attached to a sheet 23 or laminated between two sheets 23. The sheet 23 of their respective magnet array 20 band is affixed to the floor by adhesive or mechanical attachment members at a specified location and in a specified orientation.

The parking system of the invention utilizes a plurality of trays 24, as shown in FIGS. 3, 4, 7 and 8. Each tray 24 includes a substantially rectangular parking platform 26 with a top surface 28 for supporting a vehicle thereon and a bottom surface 29. Legs 30 project down from the parking platform 26 for supporting the parking platform 26 in a spaced position from the floor. The legs 30 may flare outward or inward slightly so that a plurality of parking trays 24 can be nested vertically for storage and transportation.

Figure 3:
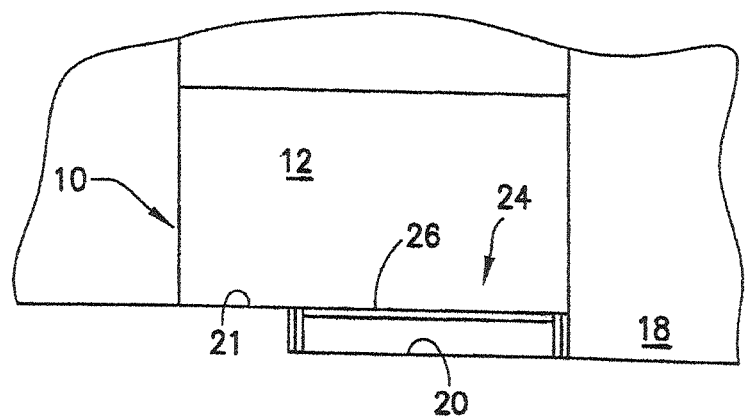
FIG. 3 is a cross-sectional view taken along line 3-3 of FIG. 2.
Figure 4:
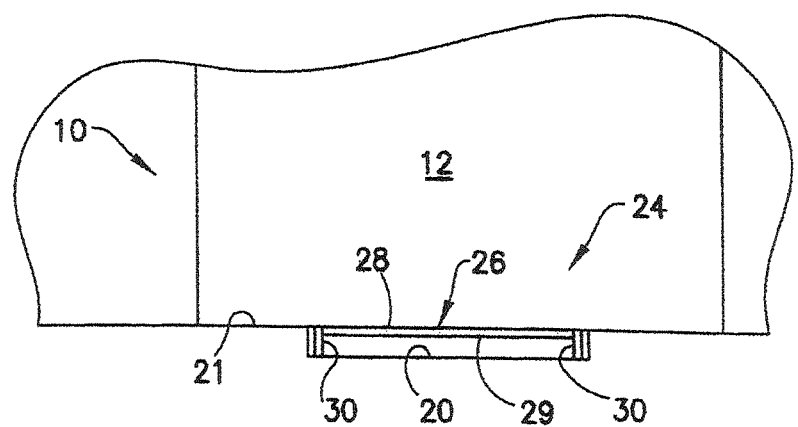
FIG. 4 is a cross-sectional view taken along line 4-4 of FIG. 2.
Figure 5:
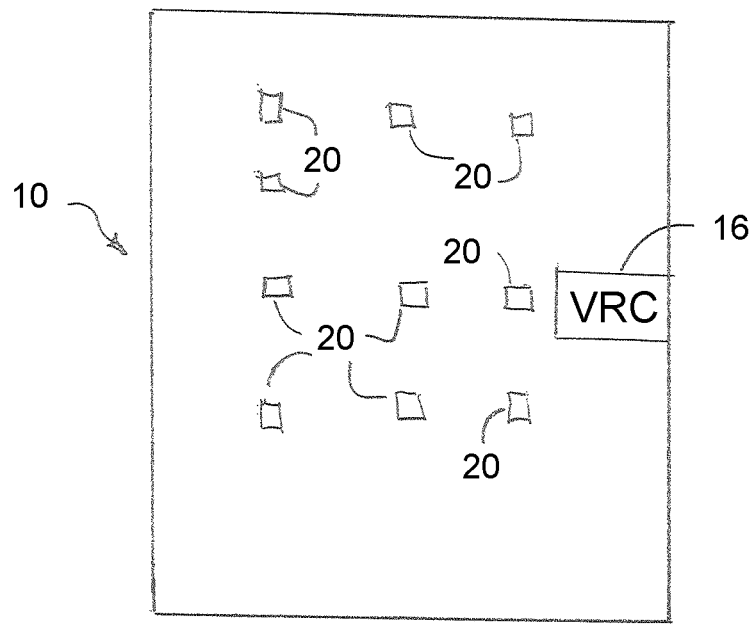
FIG. 5 is a top plan view of a portion of an upper level floor of the parking facility where vehicles are parked, and further showing the magnet arrays on the upper level floor of the parking facility.
Figure 6:
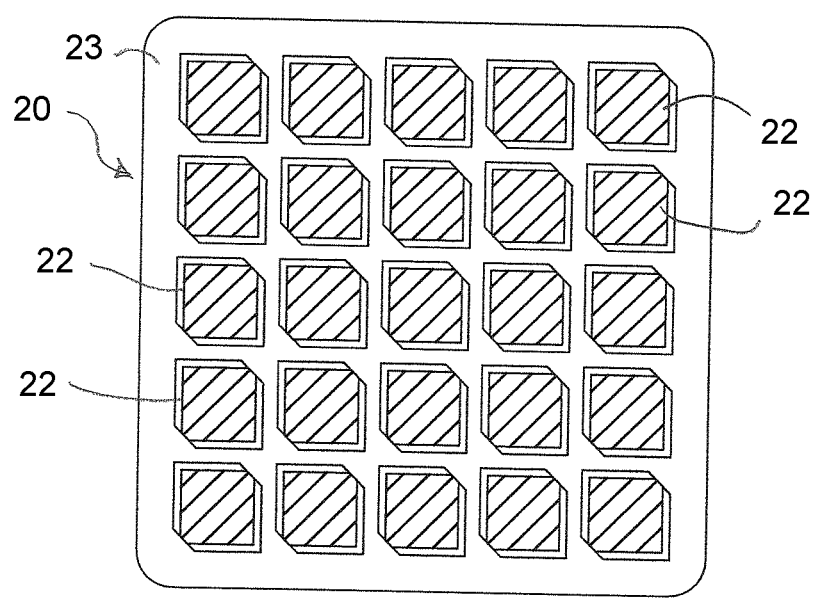
FIG. 6 is a top plan view of one embodiment of a magnet array in accordance with the invention.
Figure 7:
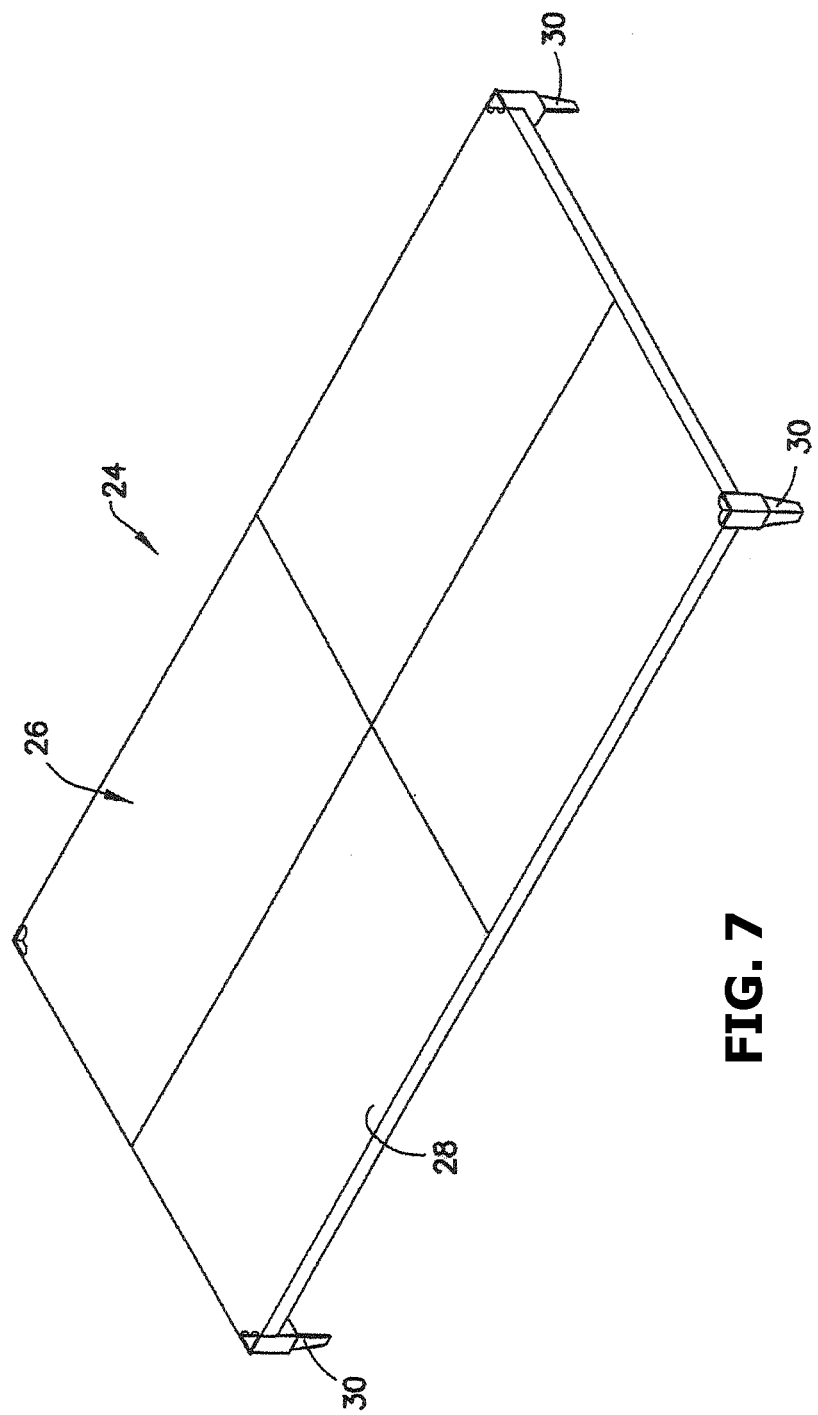
FIG. 7 is a perspective view of a tray in accordance with the invention.
Figure 8:
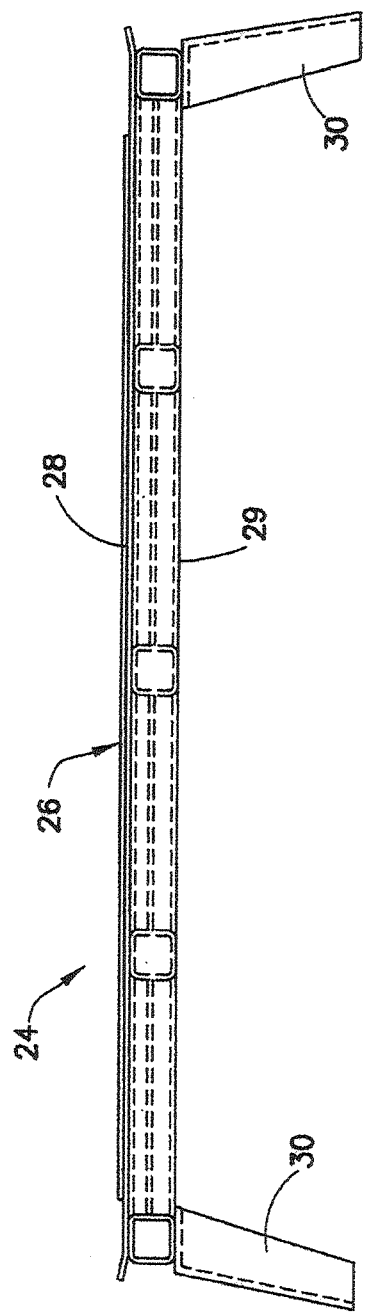
FIG. 8 is a side elevational view of the tray.
Figure 9:
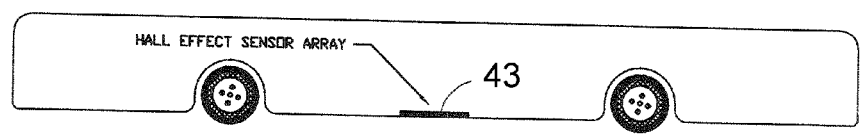
FIG. 9 is a side elevational view of an automated guided vehicle in accordance with the invention.
Figure 10:
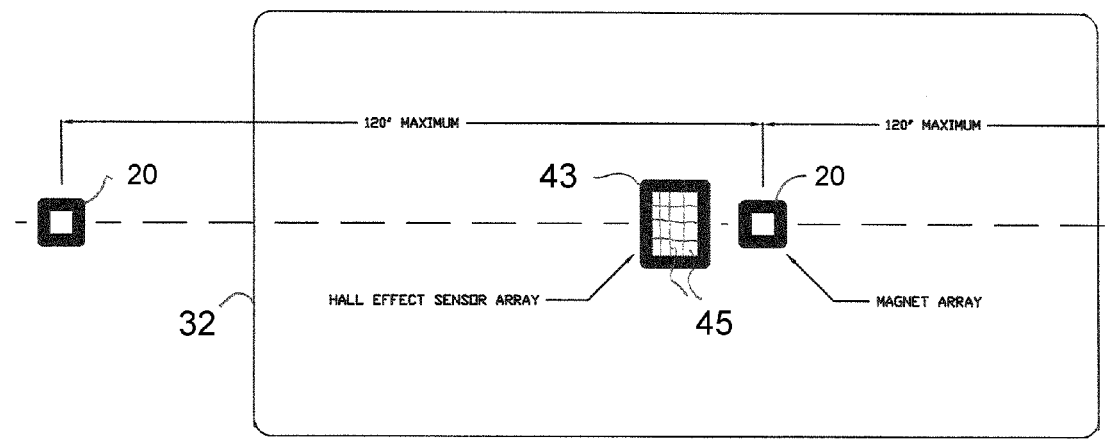
FIG. 10 is a top elevational plan view of the automated guided vehicle on a parking floor and in proximity to two of the magnet arrays.
Figure 11:
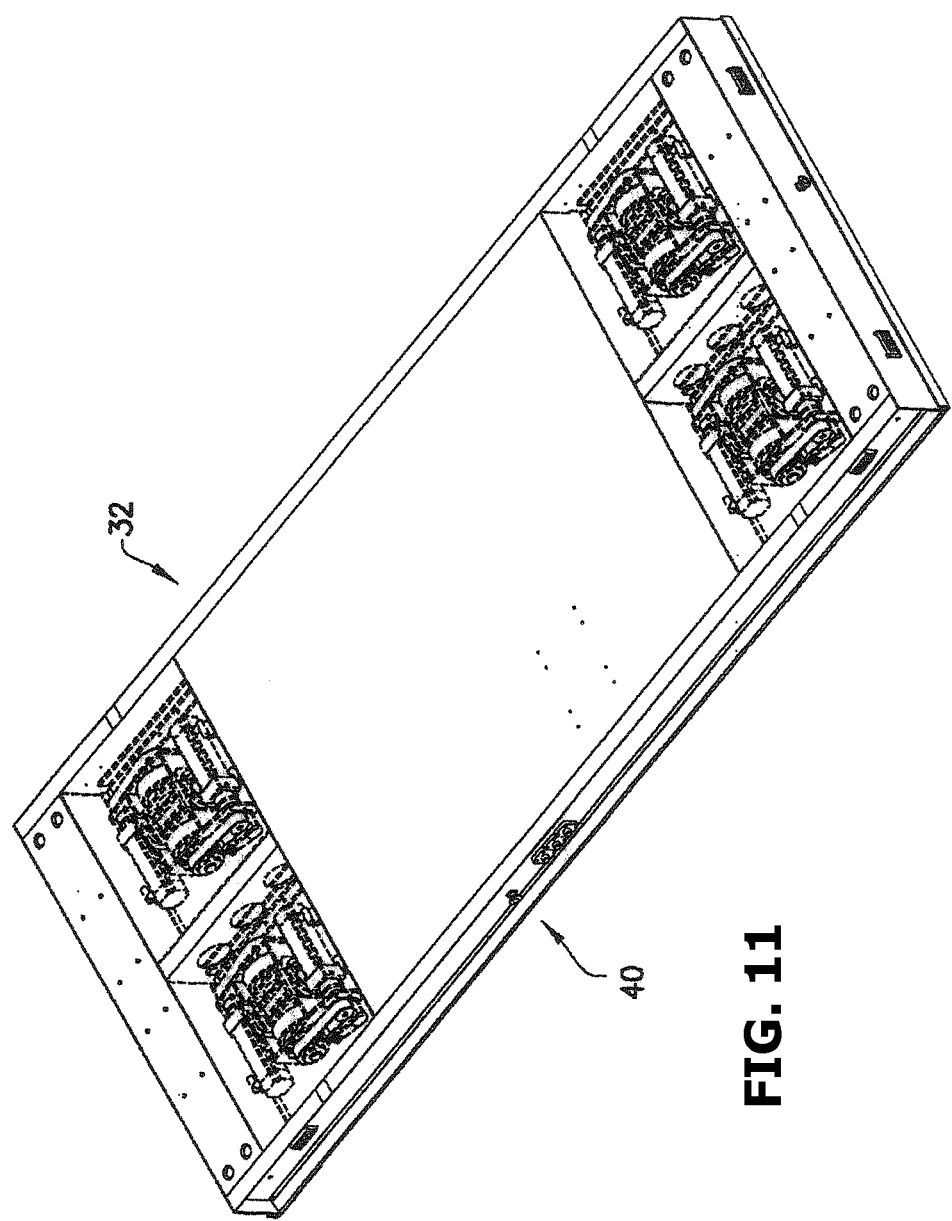
FIG. 11 is a bottom perspective view of the automated guided vehicle of FIG. 9.
Figure 12:
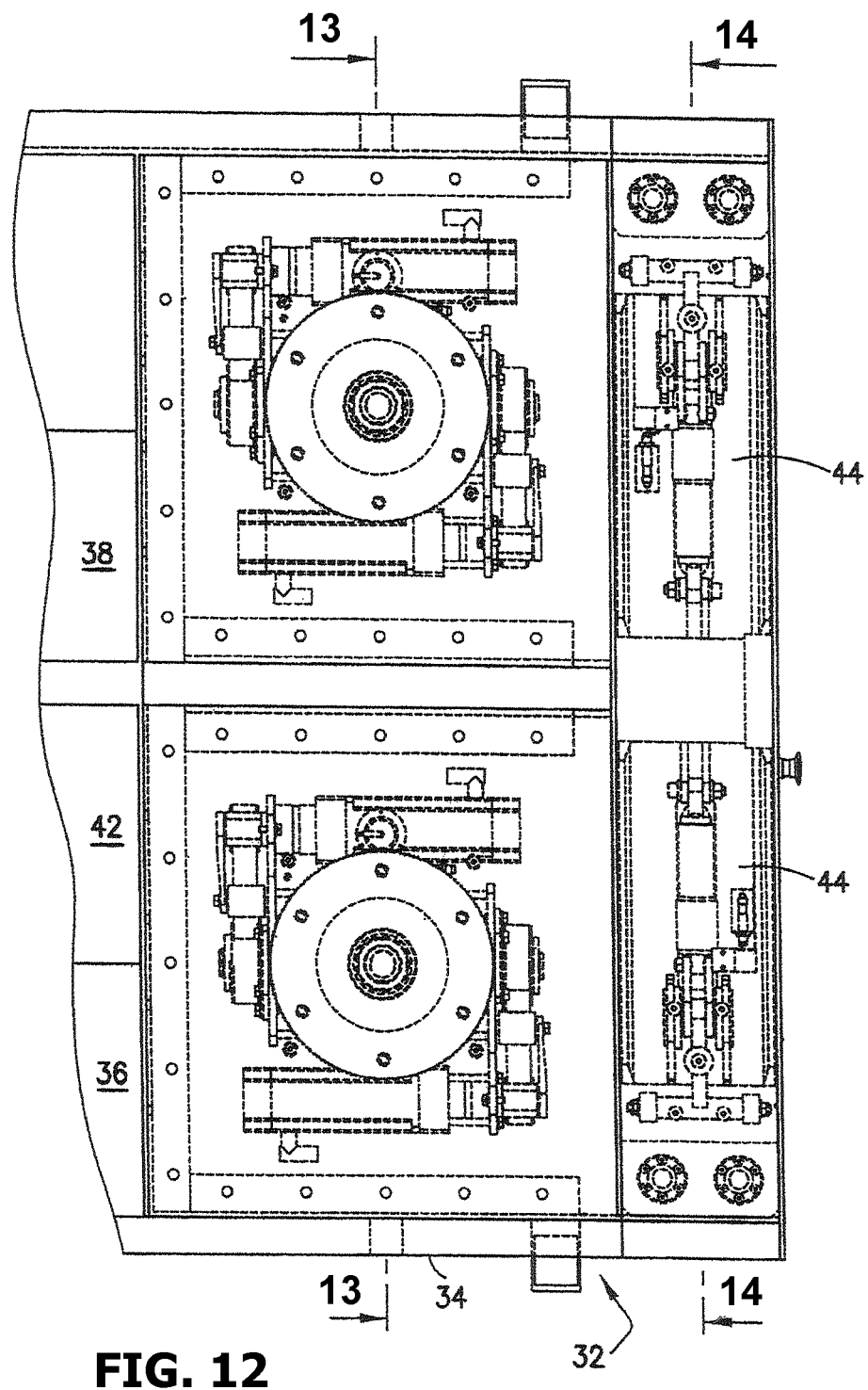
FIG. 12 is a bottom plan view of one end of the automated guided vehicle.
Figures 13, 14:
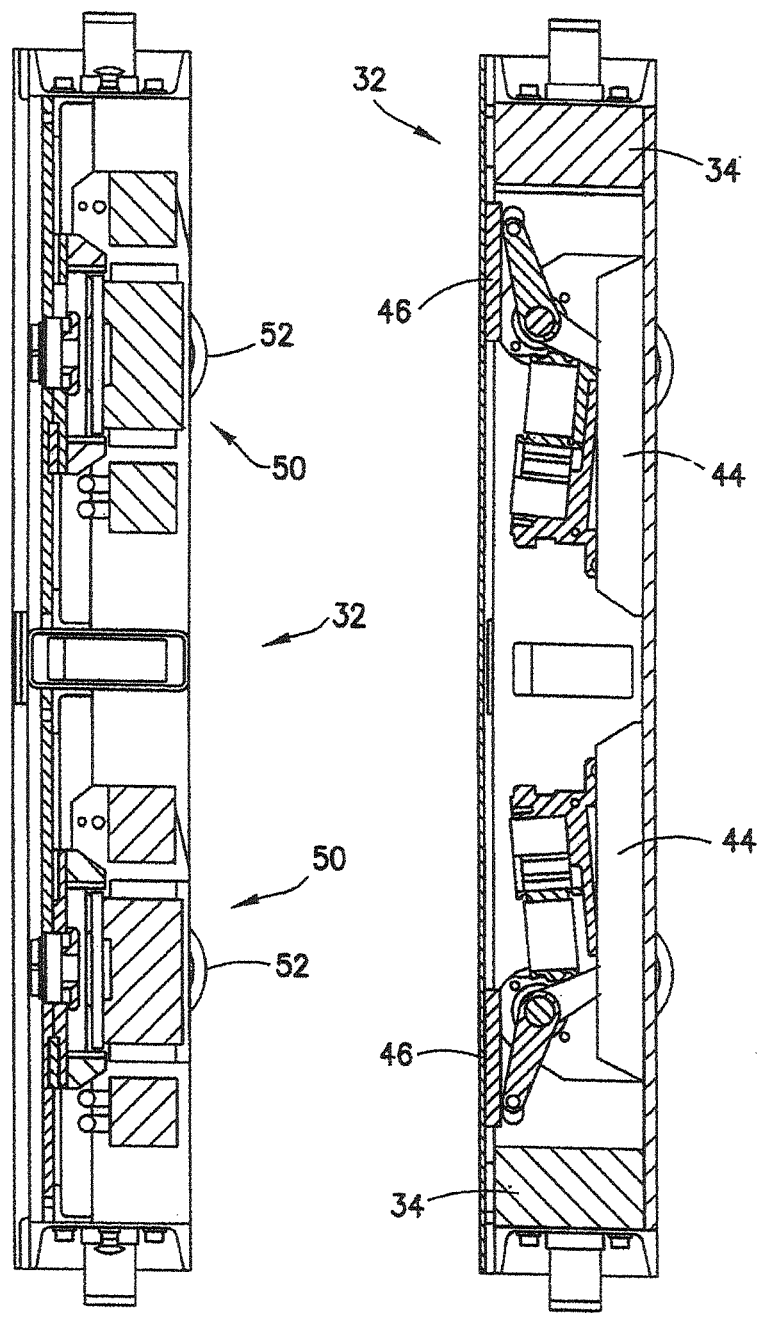
FIG. 13 is a cross-sectional view taken along line 13-13 in FIG. 12.
FIG. 14 is a cross-sectional view taken along line 14-14 in FIG. 12.
Figure 15:
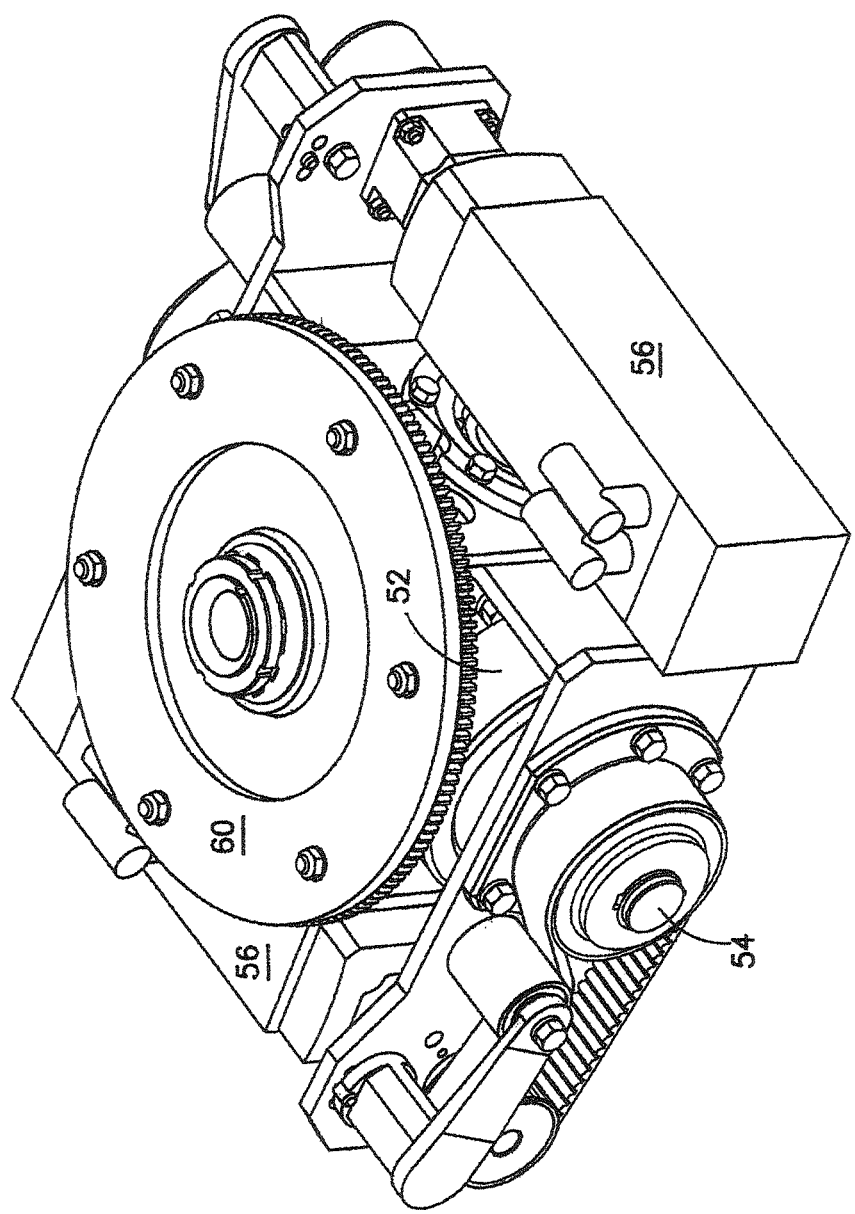
FIG. 15 is a perspective view of a drive device for the automated guided vehicle.
Figure 16:
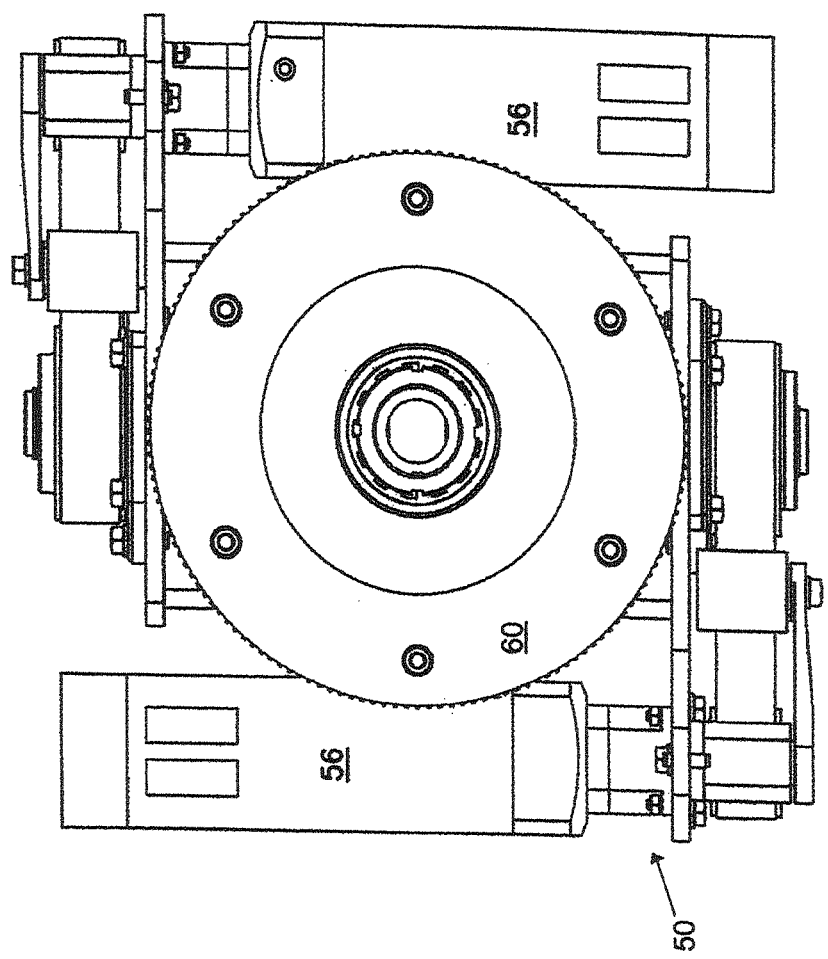
FIG. 16 is a top plan view of the drive device.
Figure 17:
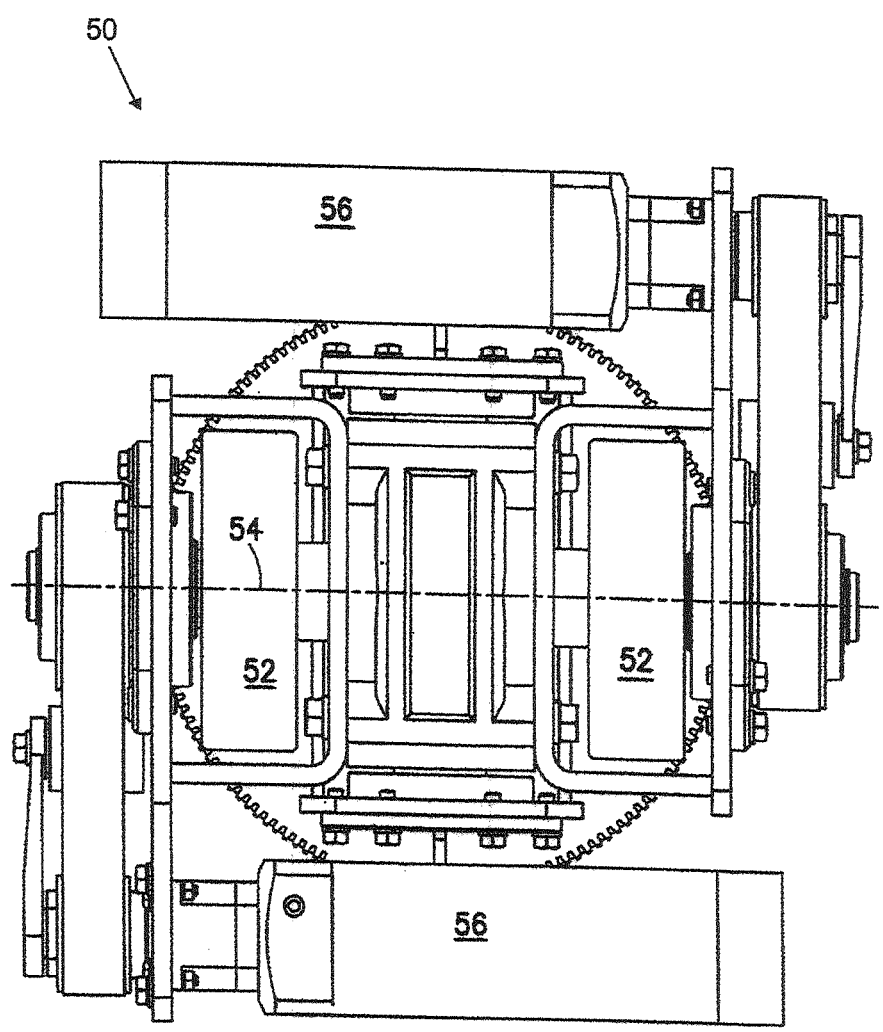
FIG. 17 is a bottom plan view of the drive device.
Figure 18:
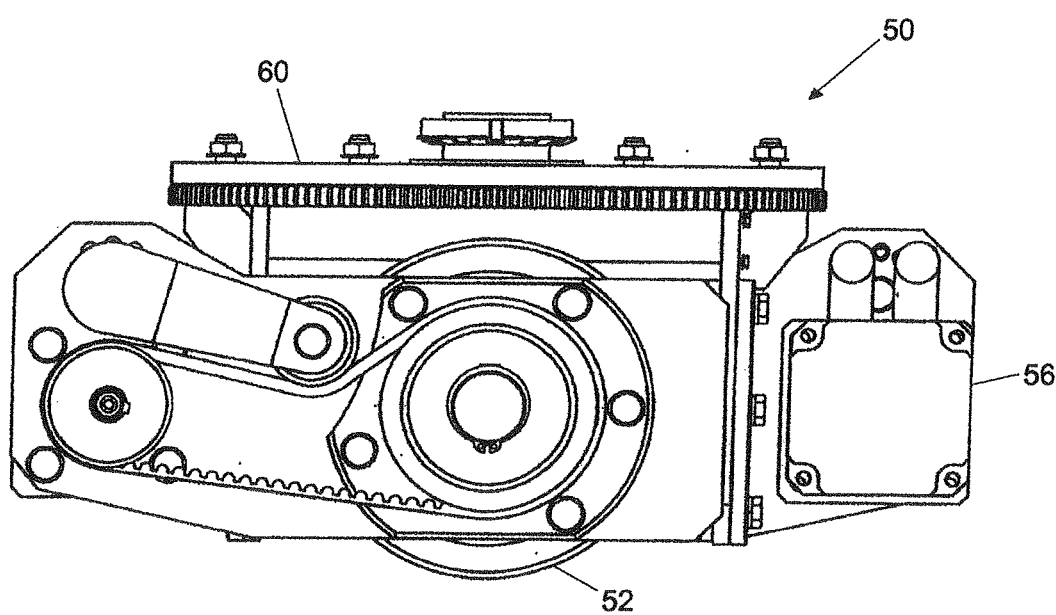
FIG. 18 is a side elevational view of the drive device.

The ingress and egress bays 12 and 14 each include a recessed floor 20 dimensioned to receive one of the trays 24 or a magazine of trays 25, as shown in FIGS. 3 and 4 and as explained further below. The recessed floor 20 is lower than the floor 21 at other locations in the ingress or egress bays 12 or 14 by a distance substantially corresponding to the height of the tray 24 or a height of the magazine. Thus, the top surface 28 of the parking platform 26 will be substantially flush with the floor 21 adjacent the recessed floor 20 when the tray 24 is positioned on the recessed floor 20 in the ingress or egress bay 12 or 14, as shown in FIGS. 3 and 4. As a result, a vehicle that enters the ingress bay 12 can drive across the floor 21 and onto the upper surface 28 of the parking platform 26 of the tray 24. Similarly a vehicle on a tray 24 in the egress bay 14 can drive from the upper surface 28 of the parking platform 26 of the tray 24 onto the floor 21 of the egress bay 14 and out of the parking garage 10. The floor in the queuing area 18 is substantially flush with the floor in the recess 20 as shown most clearly in FIG. 3. At least one movable platform 31 is provided in proximity to the recessed floor 20 in the ingress bays 12 and the egress bay 14 and can be moved between first and second positions. The upper surface of the movable platform 31 is flush with the floor 21 and flush with the upper surface 28 of the parking platform 26 of the tray 24 when the movable platform 31 is in the first position so that a passenger easily can exit or enter the vehicle in the ingress bay 12 or the egress bay 14 by walking across the movable platform 31. The upper surface of the movable platform 31 is displaced sufficiently in the second position so that the space under the tray 24 can be accessed for lifting and moving the tray 24, as explained further herein. The movement of the platform 31 between the first and second positions can be vertical, horizontal or a combination of vertical and horizontal movements.

The parking system of the invention also includes automated guided vehicles (AGV) 32 for transporting the trays 24 throughout the parking garage 10 with or without vehicles thereon, as shown in FIGS. 9-18. Each AGV 32 includes a substantially rectangular frame 34 that includes an interior 36 for accommodating the operative parts of the AGV 32. More particularly, the interior 36 of the frame 34 includes an array of rechargeable batteries 38 for providing power to operate the AGV 32. The batteries 38 communicate with one or more recharging connectors 40 in a peripheral region of the frame 34. Additionally, the interior of the frame 34 includes a controller 42 for controlling the various operative parts of the AGV 32 as explained herein. The controller 42 further includes a transmitter and a receiver for communicating with a central control for the parking garage 10. The interior of the frame 34 of the AGV 32 further includes a Hall effect sensor apparatus 43 that communicates with the controller 42. The Hall effect sensor apparatus 43 includes an array of Hall effect sensors 45 to sense the magnets 22 in each magnet array 20 as the Hall sensors 45 moves into a position opposed to the respective magnets 22 of the corresponding magnet array 20. The number of Hall effect sensors 45 in the Hall effect sensor array 43 can be selected in accordance with the desired sensitivity and the size and complexity of the parking garage 10. In one embodiment, the Hall effect sensor array 43 has 16 rows and 27 columns.

The AGV 32 further includes four platform lifts 44 disposed within the interior 36 of the frame 34. More particularly, two platform lifts 44 are disposed in proximity to each of the respective longitudinal ends of the AGV 32. The two platform lifts 44 at each end of the AGV 32 are connected to a tray support platform 46 that can be raised or lowered relative to the frame 34. At the lowered or retracted position, the tray support platforms 46 are substantially flush with the upper surface of the frame 34. In the raised or extended position, the tray support platforms 46 project slightly above the upper surface of the frame 34. The platform lifts 44 and the respective tray support platforms 46 are used to raise and lower the trays 24 with or without vehicles thereon as explained herein.

The AGV 32 further includes four drive devices 50 disposed at corners of a rectangle and disposed inwardly of the elevator mechanisms 44. Each drive device 50 includes two wheels 52 mounted for rotation about a horizontal axis 54. The two wheels 52 of each drive device 50 are driven respectively by two drive motors 56 so that each wheel 52 has a dedicated drive motor 56. The assembly of wheels 52 and drive motors 56 on each drive device 50 is mounted to a turntable 60 so that the assembly of wheels 52 and drive motors 56 on each of the drive devices 50 can be rotated about a vertical axis. The turntable 60 freely rotatable about a vertical axis and is driven rotatably by the wheels 52 and their respective drive motors 56. The drive motors 56 are operated independently pursuant to signals received from the controller 42 of the respective AGV 32, which in turn is driven by controls of the parking garage.

The longitudinal and lateral dimensions of each AGV 32 enable the AGV 32 to fit between the legs 30 of a tray 24. Additionally, the height dimensions of each AGV 32 enable the AGV 32 to fit beneath the parking platform 26 of the tray 24 when the tray is supported on the legs 30.

In use, a tray 24 will be positioned on the recessed floor 20 in the ingress bay 12 of the parking garage 10 at a position so that a vehicle can drive across the floor 21 of the ingress bay 12 and onto the parking surface 28 of the parking platform 26 of the tray 24. Electro-optical signage in the ingress bay 12 will guide the driver of the vehicle to a proper position on the tray 24. The driver then will exit the vehicle and issue appropriate instructions regarding parking duration and payment method. The instructions may be delivered verbally to an employee of the parking garage 10 or may be delivered electronically, as explained above. The movable platform 31 will move to the second position after the driver and any passengers exit the ingress bay 12. An AGV 32 then will move from the queue area 18 and into the space beneath the parking platform 26 of the tray 24 so that the tray 24 and the vehicle thereon can be raised and moved to the queue area 18 and/or the VRC 16. This process can be carried out in reverse at the egress bay 14. More particularly, an AGV 32 can deliver a tray 24 and the vehicle thereon onto the recessed floor 20 in the egress bay 14. The AGV 32 then will exit the egress bay 14 and return to the queue area 18. The movable platform 31 then will move from the second position to the first position where the upper surface of the movable platform 31 is flush with the floor 21 in the egress bay 14. The driver and any passengers then will be permitted to enter the egress bay 14 so that the vehicle can exit the parking garage 10.

The tray 24 with the vehicle thereon then will be transported to the VRC 16. This transportation between the ingress bay 12 and the VRC 16 can be carried out by any of several optional means. Preferably, an AGV 32 will move beneath the tray 24. The platform lifts 44 of the AGV 32 then will be moved into their extended positions so that the tray 24 with the vehicle thereon is elevated slightly from the floor 20 so that the AGV 32 can transport the tray 24 and the vehicle thereon to the VRC 16. Alternatively, a conveying mechanism can move the vehicle from the ingress bay 12 to the VRC 16.

The VRC 16 will move the tray 24 with the vehicle thereon to a selected floor in the garage 10 for parking. An AGV 32 then will transport the tray 24 and the vehicle to a preselected parking location. More particularly, the AGV 32 will move between the legs 30 of the tray 24 and into a position for properly supporting the tray 24. This accurate positioning can be determined by the Hall sensor 43 on the AGV 32 and the magnet arrays 20 on the floor. The proper positioning of the AGV 32 relative to the tray 24 will be transmitted to the controller 42 of the AGV 32, which will generate a signal to operate the platform lifts 44 of the AGV 32. The platform lifts 44 will cause the tray support platforms 46 to move into the extended position so that the tray 24 with the vehicle thereon is lifted sufficiently for the legs 30 of the tray 24 to be spaced from the floor. The controller 42 of the AGV 32 then will issue appropriate signals for operating the drive devices 50 of the AGV 32. More particularly, the control of the AGV 32 will cause the drive motors 56 to drive the wheels 52 so that the AGV 32 delivers the tray 24 and the vehicle thereon to an appropriate pre-designated parking location. In this regard, the drive motors 56 all can be operated independently of one another pursuant to instructions received from the controller 42. In some instances, the motors 56 on a single drive device 50 will be operated in opposite directions for turning the turntable 60 to steer the AGV 32 in the required direction. The operation of the drive devices 50 will be carried out in coordination with the signals received by the Hall effect sensors 45 on the AGV 32 as the AGV moves over the respective magnet arrays 20. As noted above, the magnets 22 of each magnet array 20 has a unique combination of positive and negative poles so that the Hall effect sensors 45 can identify a particular magnet 22 as the AGV 32 moves the Hall effect sensors 43 over the magnet array 20. The Hall effect sensor array 43 will be able to identify the particular magnet array 20, and hence can determine the specific location of the AGV 32 on the floor of the parking garage 10. Additionally, the Hall effect sensor array 43 will identify the particular magnetic 22 in the magnet array 20 to determine both the position and the alignment of the AGV 32. The magnet array 20 and the Hall effect sensor array can be considered to have rows of magnetics 22 extending in a left to right direction relative to the primary travel direction of the AGV 32 and columns extending in the primary travel direction of the AGV 32. The Hall effect sensor array 43 also has rows and columns of Hall effect sensors 45 will be able to identify the left-right position of the AGV 32 depending upon the particular magnetic 22 in the first row of magnetics in the magnet array 20 that is sensed as the respective Hall effect sensors 45 of the Hall effect sensor array 43 move into a position above the magnetic array 20. If the next magnetic grid 22 sensed by the Hall effect sensor 43 is in the same column, the controller 42 will determine that the AGV 32 is traveling parallel to the columns. However, if the second magnetic 22 sensed by a particular one of the Hall effect sensors 43 is in a different column of the magnet array 20, then the controller 42 will determine that the AGV 32 is moving in a direction skewed with respect to the alignment of the columns of magnetic grids 22. Thus, an appropriate corrective instruction can be issued to the drive devices 50 of the AGV.

Once at the designated parking location, the controller 42 of the AGV 32 will issue instructions to the respective platform lets 44 to retract the tray support platforms 46 sufficiently for the legs 30 of the tray 24 to rest on the floor. The controller 42 of the AGV 32 then will operate the drive motors 56 to move the AGV 32 away from the tray 24. The AGV 32 then will be guided to another location by the Hall effect sensor array 43 and the magnet arrays 20 for performing more work, such as returning another tray 24 and the vehicle thereon to the appropriate VRC 16 to have the vehicle delivered to the egress bay 14.

The invention has been described with respect to certain preferred embodiments. However, other changes within the scope of the invention will be apparent to those skilled in the art after having read this description of the preferred embodiments and the accompanying drawings.

What is claimed is:

1. A parking facility, comprising:
    a floor;
    a plurality of magnet arrays affixed to the floor at specified positions in the parking facility, each of the magnet arrays having a plurality of magnets arranged in a plurality of rows and a plurality of columns, the rows and columns of the magnet arrays being perpendicular to one another, the magnets being disposed with positive and negative poles of the magnets in each of the magnet arrays defining a unique signature for the respective magnet array that is different from the signature for each of the other magnet arrays; and
    an automated guided vehicle having at least one drive mechanism, a Hall effect sensor array, and a controller;
    wherein the at least one drive mechanism of the automated guided vehicle is configured for moving the automated guided vehicle along the floor of the parking facility;
    wherein the Hall effect sensor array of the automated guided vehicle has a plurality of Hall effect sensors arranged in a plurality of rows and a plurality of columns, the rows and columns of the Hall effect sensor array being perpendicular to one another;
    wherein the controller of the automated guided vehicle is configured for controlling the at least one drive mechanism based at least in part on information sensed by the Hall effect sensor array as the automated guided vehicle moves along the floor of the parking facility in proximity to the magnet arrays.

2. The parking facility of claim 1, wherein each of the magnets is a thin planar structure attached to a sheet.

3. The parking facility of claim 2, wherein the magnets of each of the magnet arrays are laminated between two sheets of material.

4. The parking facility of claim 2, wherein each of the magnet arrays is adhered to the floor of the parking facility.

5. The parking facility of claim 2, wherein each of the magnet arrays is affixed to the floor by mechanical attachment members.

6. The parking facility of claim 1, wherein the controller of the automated guided vehicle is configured for controlling the at least one drive mechanism to adjust an alignment and/or position of the automated guided vehicle based on data sensed by the Hall effect sensor array as the automated guided vehicle moves along the floor of the parking facility and in proximity to the magnet arrays.

7. An automated guided vehicle (AGV) comprising:
a frame;
a drive mechanism disposed in the frame, the drive mechanism configured to move the frame along the surface of a floor;
a Hall effect sensor array disposed in the frame, the Hall effect sensor array having a plurality of Hall effect sensors arranged in a plurality of rows and a plurality of columns, the rows and columns of the Hall effect sensor array being perpendicular to one another, the Hall effect sensor array configured to sense a magnetic field signature of at least one of a plurality of magnet arrays affixed to the floor, each of the magnet arrays having a plurality of magnets arranged in a plurality of rows and a plurality of columns, the rows and columns of the magnet arrays being perpendicular to one another, the magnets being disposed such that positive and negative poles thereof define unique magnetic field signatures for each of the plurality of magnet arrays; and
a controller disposed in the frame, the controller configured to control the drive mechanism based at least in part on information sensed by the Hall effect sensor array as the drive mechanism moves the frame along the floor in proximity to the magnet arrays.

8. The AGV of claim 7, further comprising at least one platform lift disposed in the frame, the platform lift configured to lift a tray that supports an automobile.

9. The AGV of claim 7, wherein the drive mechanism comprises a plurality of wheels and a plurality of drive motors for turning the plurality of wheels.

10. The AGV of claim 7, wherein the drive mechanism is configured to move the frame along the floor of a parking facility.

* * * * *